United States Patent
Ackley

(10) Patent No.: US 8,964,735 B2
(45) Date of Patent: Feb. 24, 2015

(54) TRANSLATING MEDIA ACCESS CONTROL (MAC) ADDRESSES IN A NETWORK HIERARCHY

(75) Inventor: Jason Ackley, Cibolo, TX (US)

(73) Assignee: Rackspace US, Inc., San Antonio, TX (US)

( * ) Notice: Subject to any disclaimer, the term of this patent is extended or adjusted under 35 U.S.C. 154(b) by 153 days.

(21) Appl. No.: 13/474,958

(22) Filed: May 18, 2012

(65) Prior Publication Data

US 2013/0308641 A1    Nov. 21, 2013

(51) Int. Cl.
*H04L 12/28* (2006.01)
*H04L 29/06* (2006.01)

(52) U.S. Cl.
CPC .................... *H04L 29/06095* (2013.01)
USPC .............................. 370/389; 370/392; 370/396

(58) Field of Classification Search
None
See application file for complete search history.

(56) References Cited

U.S. PATENT DOCUMENTS

| | | | | |
|---|---|---|---|---|
| 2003/0123387 | A1* | 7/2003 | Jackson | 370/230 |
| 2007/0201490 | A1* | 8/2007 | Mahamuni | 370/395.54 |
| 2010/0014526 | A1* | 1/2010 | Chavan et al. | 370/395.53 |
| 2010/0020806 | A1 | 1/2010 | Vahdat et al. | |
| 2010/0031258 | A1* | 2/2010 | Takano et al. | 718/1 |
| 2010/0257269 | A1* | 10/2010 | Clark | 709/226 |
| 2011/0238975 | A1* | 9/2011 | Amemiya et al. | 713/150 |
| 2011/0286380 | A1* | 11/2011 | Zhu | 370/315 |
| 2011/0299537 | A1* | 12/2011 | Saraiya et al. | 370/392 |
| 2013/0124750 | A1* | 5/2013 | Anumala et al. | 709/232 |

OTHER PUBLICATIONS

U.S. Appl. No. 13/352,852 entitled "Optimizing Allocation of On-Demand Resources Using Performance Zones," filed on Jan. 18, 2012, by Erik V. Carlin, et al.

U.S. Appl. No. 13/036,219 entitled "Automated Hybrid Connections Between Multiple Environments in a Data Center," filed on Feb. 28, 2011, by Christopher Kuehl.

* cited by examiner

*Primary Examiner* — Kwang B Yao
(74) *Attorney, Agent, or Firm* — Trop, Pruner & Hu, P.C.

(57) ABSTRACT

In one embodiment a method includes receiving a packet including a destination media access control (MAC) address field having a MAC address of a hypervisor and a destination Internet protocol (IP) address field having an IP address of a virtual machine (VM) coupled to the hypervisor. The method further determines a MAC address of the VM using the IP address of the VM and applies the VM MAC address to the destination MAC address field of the packet to forward the packet to the VM.

10 Claims, 5 Drawing Sheets

TRANSLATING MEDIA ACCESS CONTROL (MAC) ADDRESSES IN A NETWORK HIERARCHY

BACKGROUND

In typical data center configurations, each virtual machine (VM) includes a media access control (MAC) address. In turn, these multiple virtual machines couple to and are controlled by a hypervisor. Thus these VMs below a hypervisor all require a unique MAC address. Within a given cabinet, there can be many hypervisor instances that couple into a top of rack (TOR) switch. This switch includes content addressable memory (CAM) tables that store an association of MAC addresses to physical locations, both for the VMs below it, as well as the MACs for all other VMs within a switching domain/huddle, which is a collection of cabinets or other aggregation of a set of servers or other computing resources of the data center.

Due to the limited size of this CAM table, a constraint is placed on the number of VMs that can be supported by a switch in a network topology.

SUMMARY OF THE INVENTION

In one aspect, the present invention includes a method for receiving, in a hypervisor, a packet including a destination media access control (MAC) address field having a MAC address of the hypervisor and a destination Internet protocol (IP) address field having an IP address of a virtual machine (VM) coupled to the hypervisor. In turn, the hypervisor can determine a MAC address of the VM using the IP address of the VM and apply the VM MAC address to the destination MAC address field of the packet and forward the packet to the VM from the hypervisor. As an example, application of the VM MAC address may include replacing the hypervisor MAC address with the VM MAC address.

The method may additionally provide for receiving a second packet in the hypervisor that includes a source MAC address field having the MAC address of the VM, replacing the MAC address of the VM in the source MAC address field with the MAC address of the hypervisor, and forwarding the second packet to a switch coupled to the hypervisor.

Another aspect of the present invention is directed to a system with a server resource having a hypervisor and a multiple VMs managed by the hypervisor. Each of these VMs may have a provisioning manifest including an IP address for the VM and a MAC address for the VM. In turn, a switch may be coupled to this and other server resources. The switch may include a content addressable memory (CAM) having entries each to associate a MAC address of a hypervisor with a physical location. The MAC addresses of the VMs can be transparent to the switch. In some embodiments, a mapping table may store entries each mapping an IP address for one of the VMs with a MAC address for the VM, to enable efficiency of translations.

DETAILED DESCRIPTION

In various embodiments, a MAC address translation technique can be implemented at a level below a TOR switch to reduce the number of unique MACs communicated to the TOR switch, thus enabling a greater number of resources, both physical and virtual, that can be coupled below the TOR switch. Note that in different embodiments, the masking of MAC addresses can occur at different locations within a network hierarchy depending on a desired implementation.

In one embodiment, a single MAC address associated with a hypervisor can be communicated from the hypervisor up to a TOR switch. This MAC address can be used as an identifier for all the VMs coupled below the hypervisor. In turn, each hypervisor may include a mechanism such as a translation table to provide a mapping between this single MAC address exposed to the upper layers of the network architecture and all of the VMs associated with the hypervisor. As will be described further below, the hypervisor can leverage information already available to it in order to perform the MAC address translation (actually, replacement as described further below) and to direct packets to the correct destination, both in upstream and downstream directions. In this way, many fewer entries of the TOR switch are consumed, enabling a greater amount of hypervisors to be allocated to a single TOR switch. This has the benefit of decoupling the scaling constraint of the network topology from the VM count, and ties it to the unit of scale deployment, the hypervisor.

Another embodiment can instead provide this exposure of a single MAC address at a higher level. For example the TOR switch itself can expose a single TOR MAC address to higher layers and in turn, the TOR switch provides a mapping or translation table to map this single MAC address to the devices coupled below it (namely hypervisors and connected VMs).

Embodiments thus provide an insulation layer for the network from performance improvements that may take place within the generic server/hypervisor equipment (ala Moore's Law). As an example, if a given amount of hypervisor switch ports are upgraded from one generation of hypervisor to another, there may 2-4× the amount of VMs may be present due to increased CPU and memory capacities of the new hypervisor platform. By performing MAC translations as described herein, there is no impact to the switching layer as this layer does not store the end-VM MAC addresses, only the MAC addresses associated with the hypervisors that perform the MAC translation. The hypervisor count, as seen by the switching layer (or any other layer higher than the hypervisor that performs the translations) may thus remain static during upgrades of the hypervisor hardware.

Figure 1:
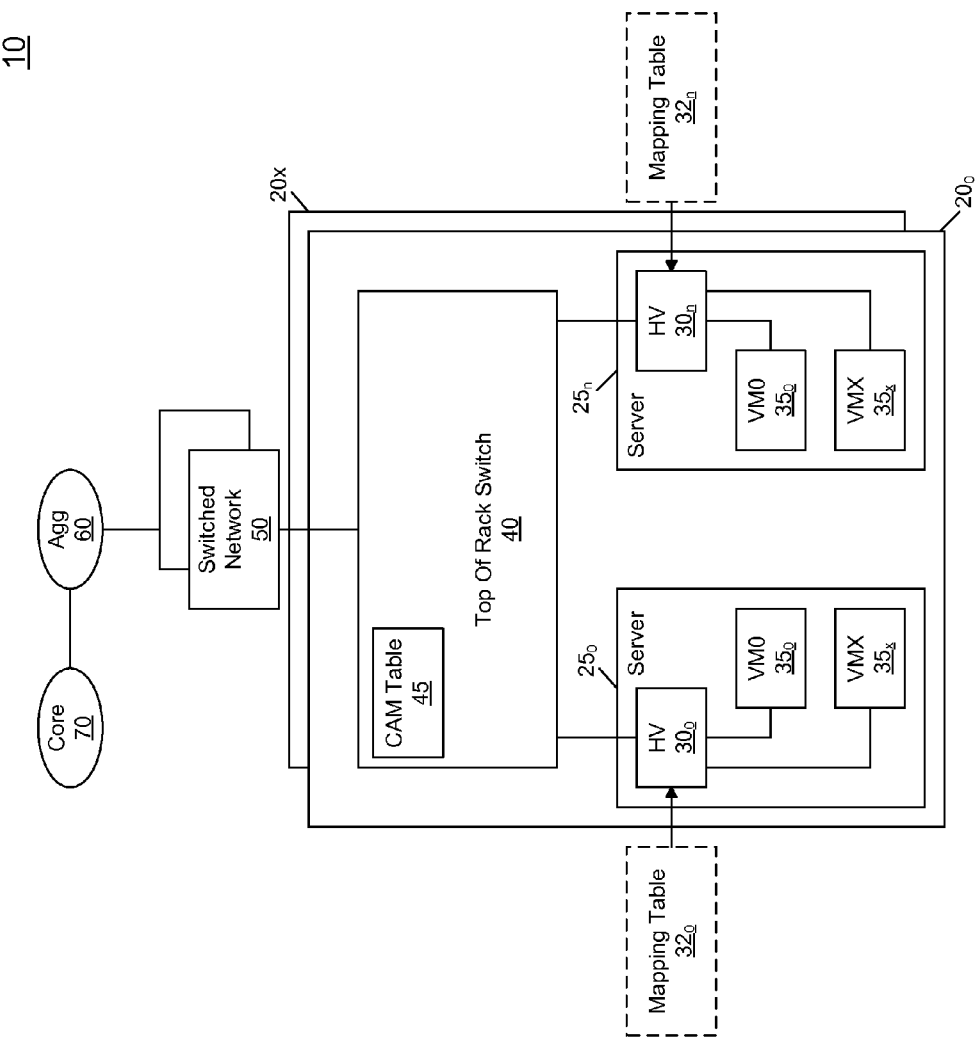
FIG. 1 is a high-level block diagram of a network architecture in accordance with an embodiment of the present invention.

FIG. 1 is a high-level block diagram of a network architecture in accordance with an embodiment of the present invention. As shown in FIG. 1, network 10 may be a portion of a data center or other networked computer environment. For purposes of discussion herein, assume that the data center is a multi-tenant data center that provides both dedicated and cloud-based resources for a number of different customers. However, understand that the scope of the present invention is not limited in this regard and embodiments may be applicable to single-tenant data centers, along with various other network architectures.

In the embodiment illustrated, individual computing resources may be provided within one or more cabinets $20_{0-x}$ (generally cabinet 20). In one example configuration, the data center can be arranged into a plurality of so-called huddles or aggregation of cabinets in which a variety of different types of computing resources may be provided. For purposes of discussion, assume that cabinet 20 includes a plurality of rack-mounted servers $25_0$-$25_n$. For example, a given cabinet may include between approximately 20 and 80 physical servers. As is known, each server can include various components including one or more processors, memory, a network interface, mass storage, and so forth. In turn, each server may include one or more hypervisors 30, each of which may be an orchestration layer to enable instantiation and control of one or more virtual machines that operate on the physical server. Thus as shown in FIG. 1, each hypervisor $30_0$-$30_n$ may include a plurality of VMs, e.g., VMs $35_0$-$35_x$, coupled below them. As examples, between 40 and 160 VMs may be allocated by a single hypervisor. Note that each VM may be allocated a portion of CPU and memory resources of the given server.

Still referring to FIG. 1, each cabinet 20 can include at least one top of rack (TOR) switch 40. In some embodiments, each cabinet may include up to 3 such switches that are used to enable communication of packets between resources within the cabinet and other network components external to the cabinet. As seen in FIG. 1, a content addressable memory (CAM) table 45 may be present within TOR switch 40. As described, CAM table 45 can include a plurality of entries, with each entry including a mapping of an IP address to a physical location (e.g., a physical port). Each CAM entry may be allocated to a resource within cabinet 20 and resources within all other cabinets of a given switching domain. By using an embodiment of the present invention, a greatly reduced consumption of these CAM entries can be realized as an entry can be allocated only for the individual hypervisors. In this way, a much greater amount of resources can be associated with a given TOR switch, thus reducing the need for more switches within a given cabinet, huddle or other collection of resources.

As further seen in FIG. 1, in an embodiment each hypervisor 30 may include or be associated with a mapping table 32 to enable mapping of a virtual IP address which may be an IP address assigned by the hypervisor to an underlying VM to a given virtual MAC address, which may be a MAC address assigned by the hypervisor to the VM. By maintaining this mapping at the hypervisor level, all packets communicated from the hypervisor up to the TOR switch and from the TOR switch down to the hypervisor can include the single MAC address for the hypervisor, reducing the number of MAC addresses communicated with the TOR switch, and thus in turn reducing the amount of CAM space consumed in the switch.

For purposes of illustration, assume that a CAM table includes 8K entries. Because this CAM table includes entries not only for the hypervisors directly below the TOR switch within a given cabinet, but also for all MAC addresses for each hypervisor within the same huddle, a greatly reduced consumption of CAM entries can be realized. Specifically by exposing only hypervisor MAC addresses to the TOR switch, the needed storage within CAM table 45 can be reduced, rather than also exposing virtual MAC addresses for each VM below each of the hypervisors.

For example, assume that each hypervisor can allocate 40 VMs below it, and assume 20 hypervisors within a cabinet. In this instance, 800 of the 8K entries in the CAM table may be completely consumed by these hypervisors of one cabinet. Instead, using transparent MAC addresses for the hypervisors in accordance with an embodiment of the present invention, only 20 CAM entries may be consumed within the CAM table of the TOR switch for this cabinet.

Still referring to FIG. 1, cabinet 20 may communicate with higher layers of a network hierarchy, including a switched network 50 that may be coupled in addition to a number of other cabinets of similar configuration. In general, network hierarchy may be configured of various layers, including a layer 3 (L3) which may correspond to an IP layer, a layer 2 (L2) which may correspond to a MAC layer, and a layer 1 (L1) which corresponds to actual physical locations, e.g., Ethernet locations.

Routing of packets within the network hierarchy can occur via L3 information, e.g., IP addresses, at higher levels of the network hierarchy. At a router level, e.g., corresponding to switch network 50, a translation from L3 to L2 may occur based on information in an address resolution protocol (ARP) table, which may provide for mappings between L3 and L2 information, namely IP addresses to MAC addresses. In this hierarchy of the network, the TOR switches may operate to provide a translation between L2 information and L1 information, namely providing a physical location identifier, e.g., a port number corresponding to a given MAC address.

As further seen in FIG. 1, in turn, switch 50 may communicate with an aggregation layer 60, which may be in communication with other switched networks of similar configuration to that of switch 50. In turn, aggregation layer 60 may communicate with a core layer 70. Although shown at this high level in the embodiment of FIG. 1, understand the scope of the present invention is not limited in this regard.

Figure 2:
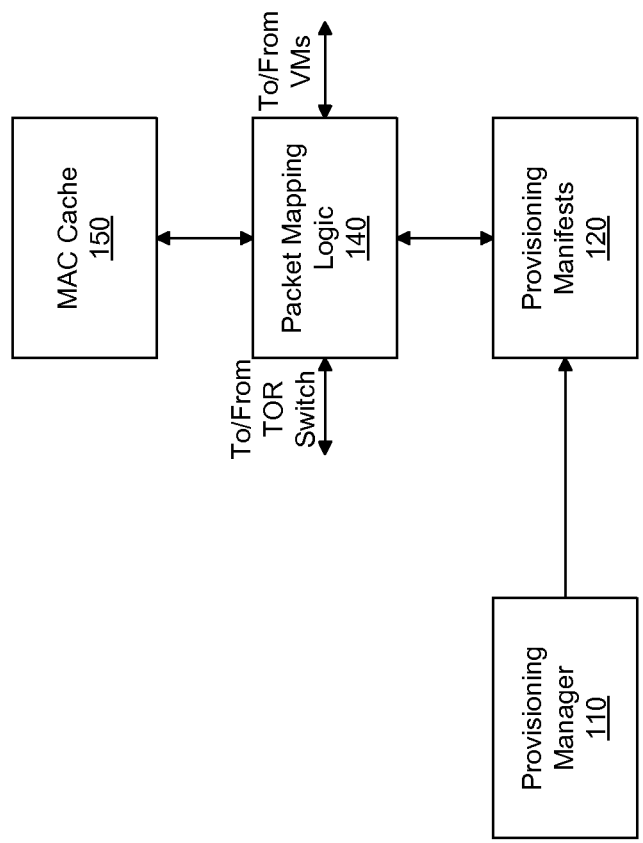
FIG. 2 is a block diagram of components of a hypervisor in accordance with an embodiment of the present invention.

Referring now to FIG. 2, shown is a block diagram of components of a hypervisor in accordance with an embodiment of the present invention. As shown in FIG. 2, hypervisor 100 may be used to control instantiation of VMs, as well as to control the flow of communication to and from the VMs. In addition, hypervisor 100 can include logic to enable masking of MAC addresses associated with the VMs such that all communications upstream (and downstream communications to the hypervisor) can be associated with a single hypervisor MAC address, rather than virtual MAC addresses associated with each of the VMs.

In the embodiment shown, provisioning manager 110 may be configured to provision or instantiate a VM on receipt of a request for a new VM. Such request can include various information such as the type of resources desired for the VM, the context information for the VM and so forth. To this end, provisioning manager 110 may allocate the resources and store various metadata information for the hypervisor in a provisioning manifest 120 for the corresponding VM. Although the scope of the present invention is not limited in this regard in an embodiment this provisioning manifest for a VM can include an IP address for the VM (referred to herein as a virtual IP address), one or more MAC addresses for the VM (referred to herein as a virtual MAC address) each for an associated virtual interface port (or virtual NIC), which is an identifier for the virtual port on which communications are directed to the VM. Note that the virtual IP address and the virtual MAC address may be migrated with the VM. Note that in this way it is possible for a number of IPv4 or IPv6 addresses to map to the same Layer2/MAC address e.g., of a given hypervisor. Other information in the provisioning manifest includes configuration information such as disk size information, CPU information (such as number of cores, speed or so forth), number of network interfaces, VM-specific configuration information and so forth. Upon allocating and thus provisioning the VM, the instantiated VM can begin operations using the allocated resources.

Still referring to FIG. 2, coupled to provisioning manifests 120 may be a packet mapping logic 140 which can be configured to map upstream packets received from the various VMs from a MAC address of the given VM to the MAC address of the hypervisor. In an embodiment, such packets received in the hypervisor may include source IP and MAC addresses as part of, e.g., a header field, to thus indicate the source of the packet. Accordingly, a target or destination of the packet may use this source MAC address, now corresponding to the MAC address of the hypervisor, as the destination for any response packet.

In addition, packet mapping logic 140 can further receive downstream packets, e.g., from a TOR switch. Such packets may include a destination IP address that corresponds to one of the VMs below the hypervisor. Using this IP address, mapping logic 140 can access information in one or more of provisioning manifests 120 to thus identify the appropriate VM for the packet. Thus mapping logic 140 may replace a destination MAC address in the received packet (corresponding to the hypervisor MAC address) with the MAC address for the destination VM. In other words, the hypervisors can use L3 information, namely a virtual IP address, to populate L2 information, namely the virtual MAC address, into a downstream packet. Mapping logic 140 may also extract additional information such as a virtual interface identifier of the VM.

Although in many embodiments packet mapping logic 140 can access information in provisioning manifests 120 to perform such mappings, performance may be enhanced by providing some type of mapping table or cache to store either all hypervisor translations of virtual IP addresses to virtual MAC addresses or at least the most recently used or most frequently used translations. Thus as shown in FIG. 2, a MAC cache 150 may be provided, which can be used by packet mapping logic 140 to thus speed the translation and replacement of hypervisor MAC addresses of the MAC address field in received downstream packets with the MAC address of a given VM. Although shown at this high level in the embodiments of FIG. 2, understand the scope of the present invention is not limited in this regard.

Figure 3:
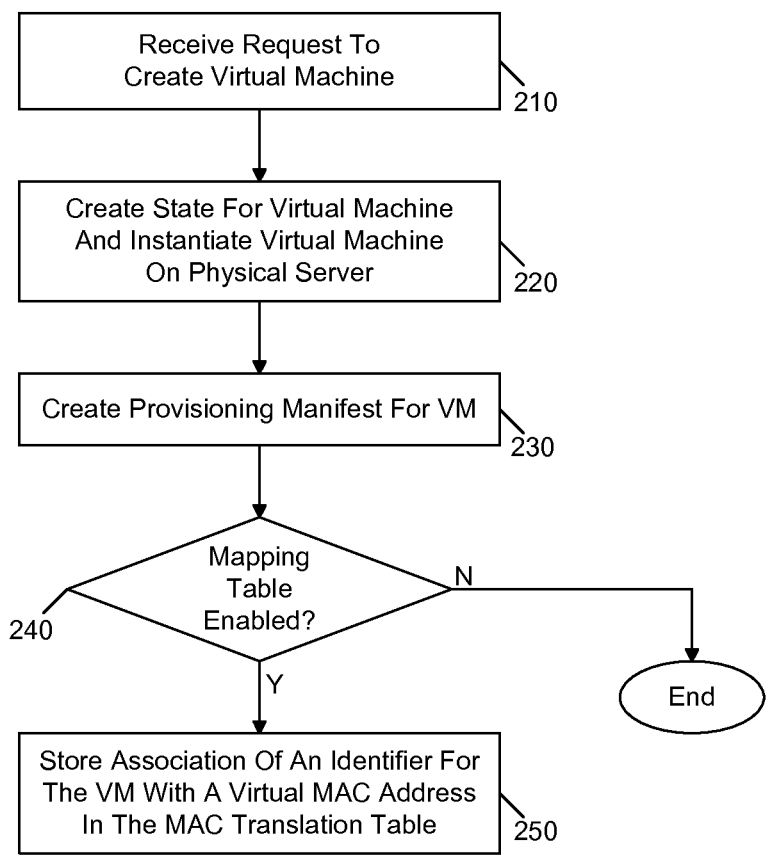
FIG. 3 is a flow diagram of a method for instantiating a virtual machine in accordance with an embodiment of the present invention.

Referring now to FIG. 3, shown is a flow diagram of a method for instantiating a virtual machine in accordance with an embodiment of the present invention. As shown in FIG. 3, method 200 may be used when a hypervisor receives a request to create a new VM, e.g., to spin up a VM (block 210). This request can come from various entities in different embodiments. For example, VMs can be spun up by system administrators, directly from end customers or other automated or user-controlled entities. Control next passes to block 220 where state for the VM can be created and the VM can be instantiated on a physical server. This instantiation on a physical server can include allocating a requested amount of the total resources of the server to the VM, including CPU and memory resources among other such resources including network resources and the like.

Control next passes to block 230 where a provisioning manifest can be created for the VM. This provisioning manifest can be stored within the hypervisor itself or another location accessible to the hypervisor. Various metadata can be stored in the provisioning manifest. For purposes of discussion herein, understand that this metadata can include an IP address for the VM, a MAC address for the VM (both of which can be allocated by the hypervisor and which are locally unique identifiers with respect to the hypervisor but possibly may not be globally unique, particularly with regard to the MAC address, which may not be communicated beyond the hypervisor). In other words, the virtual MAC address is not a registered MAC address.

Still referring to FIG. 3, next control passes to diamond 240 where it can be determined whether a mapping table is enabled. This mapping table, which can include associations between the IP address for the VM and the MAC address for the VM and/or other identities of the VM, may be selectively present in some implementations, e.g., as dictated by available resources for this mapping table, as well as whether the faster speed of translations that may be realized by using such table is desired. If this table is not enabled, the method of instantiating the VM may conclude and normal VM operations can proceed.

Otherwise when this mapping table is enabled control passes to block 250, where an association of an identifier for the virtual machine with a virtual MAC address can be stored in the MAC translation table. Although the scope of the present invention is not so limited in many implementations this virtual machine identifier may be the IP address for the VM. However, understand that other identifiers may be used instead. And still further, understand that in other embodiments, an arbitrary identifier may be used, which can be generated by the hypervisor. Note that the IP address for the VM may act as the key to access an entry in this table. In other words, when a destination packet is received with an IP address of the VM, this IP address can be used to access an entry including the MAC address for the VM. Also understand that when a given VM is disabled or detected, the corresponding entry in this translation table may similarly be invalidated or deleted. Although shown at this high level in the embodiment of FIG. 3, understand the scope of the present invention is not limited in this regard.

Figure 4:
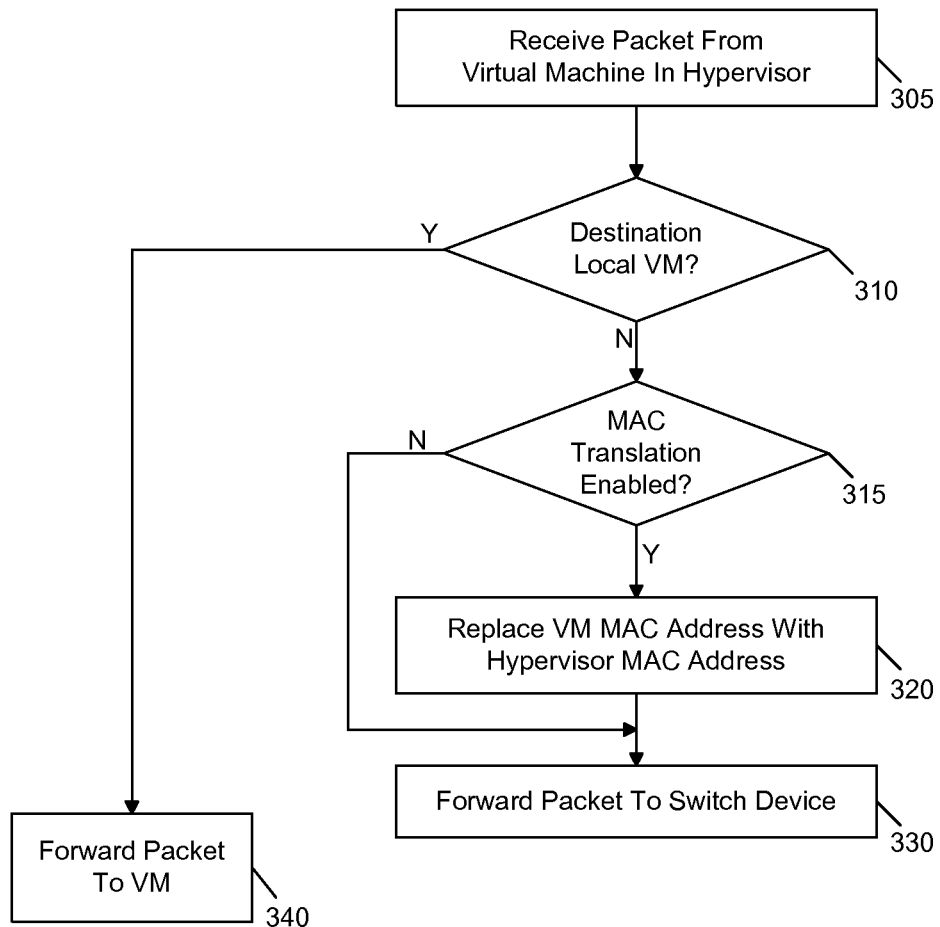
FIG. 4 is a method for handling virtual machine egress traffic in accordance with one embodiment of the present invention.

Referring now to FIG. 4, shown is a method for handling virtual machine egress traffic, namely from a VM to an upstream destination, in accordance with one embodiment of the present invention. As shown in FIG. 4, method 300 may be implemented within a hypervisor that performs translation of a VM MAC address to a MAC address of the hypervisor itself. As seen in FIG. 4, method 300 can begin by receiving a packet or frame in the hypervisor (block 305). Note that this packet or frame may be any type of communication from a VM that is directed to another location in a network architecture, e.g., to a different VM coupled to the same hypervisor, to another VM within a single cabinet, or another location, accessed via the Internet.

Referring still to FIG. 4, next it can be determined if this packet is destined for a local VM (e.g., under the same hypervisor) (diamond 310). If so, control passes to block 340, where the packet can be forwarded to this VM, and the method thus concludes.

Otherwise at diamond 315 it can be determined if MAC translation in accordance with an embodiment of the present invention is enabled. If so, control passes to block 320 where a hypervisor MAC address may replace a value of a source MAC address field received in the packet, namely a MAC address of the VM, with the hypervisor MAC address. This substitution or replacement thus identifies to the packet recipient that the source of the packet is the hypervisor, rather than the particular VM that initiated the packet. Control next passes to block 330 where the packet can be forwarded, e.g., to an upstream switch device such as TOR switch. Note that although shown with this particular implementation in the embodiment of FIG. 4, understand that MAC substitution or replacement can occur at different levels of a network hierarchy.

Figure 5:
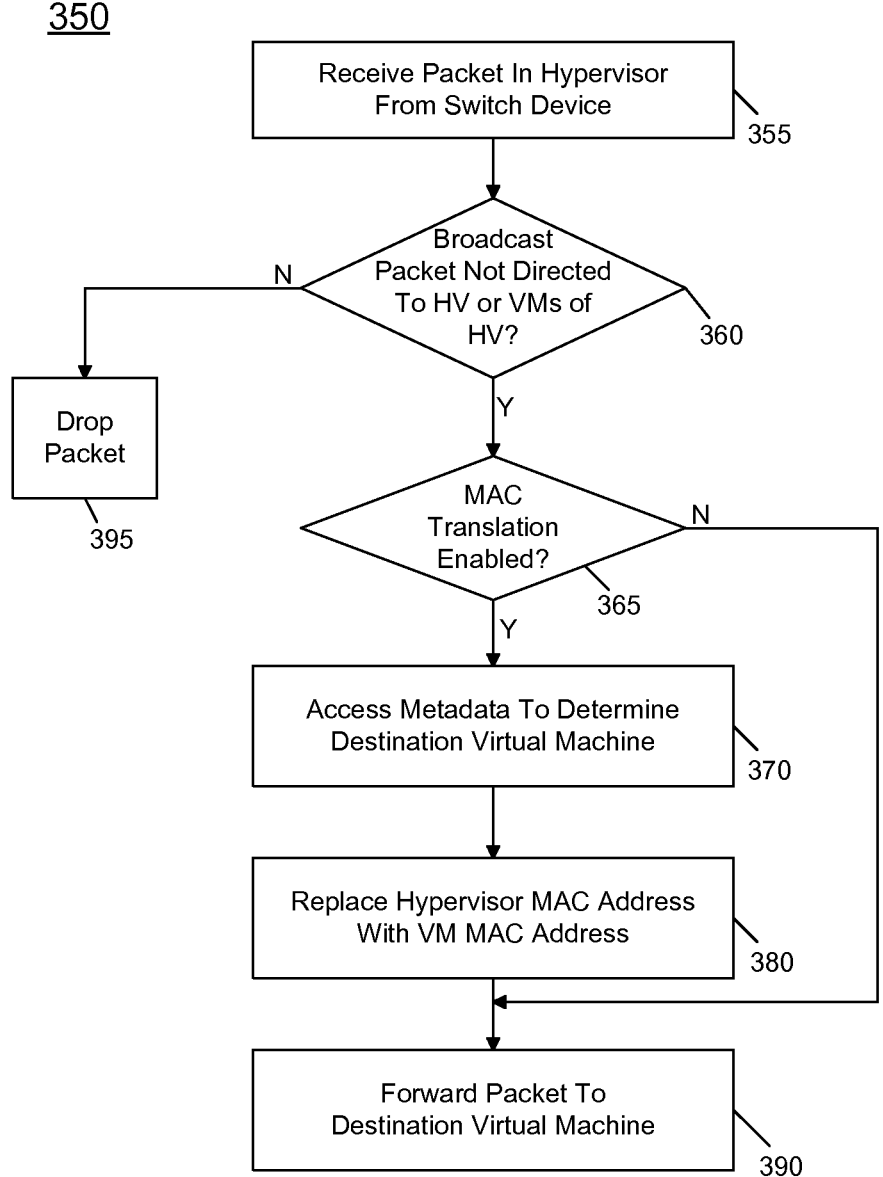
FIG. 5 is a flow diagram of a method for handling virtual machine ingress traffic in accordance with an embodiment of the present invention.

Referring now to FIG. 5, shown is a flow diagram of a method for handling virtual machine ingress traffic in accordance with an embodiment of the present invention. Method 350 may be performed in a hypervisor that receives downstream traffic directed to a virtual machine coupled to the hypervisor. As seen, method 350 may begin by receiving a packet from a switch device (block 355). Of course understand that this packet may be received from another location in other examples.

As seen in FIG. 5, control passes to diamond 360 where it can be determined whether the received packet is a broadcast packet that is not directed to the hypervisor or to VMs of the hypervisor. For example, the hypervisor may operate in a promiscuous mode in which it receives all packets communicated downward from a switch and filters the packets to only process those packets directed to the hypervisor itself or its VMs. If the received packet is not for this hypervisor or one of its VMs, control passes to block 395 where the packet may be dropped. Otherwise, control passes to diamond 365, where it can be determined whether MAC translations are enabled. That is, in some embodiments it is possible that the MAC translation mechanism described herein to reduce the visibility of MAC addresses to the switch and higher layers of a network hierarchy can be selectively enabled or disabled. If disabled, diamond 365 is thus in the negative and control passes directly to block 390, discussed below. If instead operation is in accordance with an embodiment of the present invention with MAC translations enabled, control passes to block 370.

At block 370 certain metadata can be accessed to determine the destination for this packet. In different embodiments, this metadata information from the received packet can be used to access, e.g., a mapping cache or a provisioning manifest, and can include, for example, layer 3 information such as the destination IP address of the received packet. In turn, the VM may replace a MAC address in the received packet, namely the destination MAC address field, which may include the MAC address of the hypervisor, with the MAC address for the destination VM based on this metadata information (block 380). Control then passes to block 390 where the packet can be forwarded to the destination VM using this MAC address for the destination VM. Although shown at this high level in the embodiment of FIG. 5, understand the scope of the present invention is not limited in this regard.

By providing this single MAC address exposure to higher levels, greater ease of scalability is realized and in addition, the unit of scale (e.g., VMs) need not consume MAC addresses, allowing for much greater numbers of VMs to couple into a single TOR switch. This can be done at still higher layers of a network configuration such as at an aggregation or core layer.

Embodiments thus allow the TOR switch to remain low-cost by not implementing a device that has large TCAM space. In some networking architectures, the TOR switch is the most populous device in the network as well as the most expensive networking item when building a data center due to the quantity that are required. By performing the decoupling of the TOR from the VM count, cloud networks can be more effectively scaled, allowing hypervisors to dramatically increase VM density without impact or upgrades to the network related to MAC scaling problems.

Embodiments may be implemented in code and may be stored on a non-transitory storage medium having stored thereon instructions which can be used to program a system to perform the instructions. The storage medium may include, but is not limited to, any type of non-transitory storage medium suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving, in a hypervisor from a switch of a rack including a server having the hypervisor, a packet including a destination media access control (MAC) address field having a MAC address of the hypervisor and a destination Internet protocol (IP) address field having an IP address of a virtual machine (VM) coupled to the hypervisor;
determining, in the hypervisor, a MAC address of the VM using the IP address of the VM;
applying, in the hypervisor, the MAC address of the VM to the destination MAC address field of the packet and forwarding the packet to the VM from the hypervisor, wherein the MAC address of the VM is not exposed to the switch, wherein applying the MAC address of the VM comprises replacing the MAC address of the hypervisor with the MAC address of the VM;
accessing, via the hypervisor, a mapping table associated with the hypervisor to determine the MAC address of the VM;
populating the mapping table with the MAC address of the VM using information from a provisioning manifest for the VM; and
creating the provisioning manifest, via the hypervisor, during instantiation of the VM by the hypervisor.

2. The method of claim 1, further comprising:
receiving, in the hypervisor, a second packet including a source MAC address field having the MAC address of the VM;
replacing, in the hypervisor, the MAC address of the VM in the source MAC address field with the MAC address of the hypervisor; and
forwarding the second packet to the switch from the hypervisor.

3. The method of claim 2, further comprising storing the MAC address of the hypervisor in an entry of a content addressable memory (CAM) of the switch.

4. A system comprising:
a server resource including a hypervisor and a plurality of virtual machines (VMs) managed by the hypervisor, each of the plurality of VMs having a provisioning manifest stored in the hypervisor and including an Internet protocol (IP) address for the VM and a media access control (MAC) address for the VM;
a switch coupled to the server resource and a plurality of other server resources, the switch including a content addressable memory (CAM) having a plurality of entries each to associate a MAC address of a hypervisor with a physical location, wherein the MAC addresses of the plurality of VMs are transparent to the switch and the switch is to route packets destined to the plurality of VMs to the hypervisor based on an entry of the CAM associated with hypervisor; and a mapping table associated with the hypervisor to store a plurality of entries each mapping an IP address for one of the plurality of VMs with a MAC address for the one of the plurality of VMs.

5. The system of claim 4, wherein the packets destined to the plurality of VMs each include a destination MAC address field having the MAC address of the hypervisor.

6. The system of claim 4, wherein the hypervisor is to receive a packet including a destination MAC address field having the MAC address of the hypervisor and a destination IP address field having an IP address of one of the plurality of VMs, determine a MAC address of the one of the plurality of VMs using the IP address, and replace the MAC address of the hypervisor in the destination MAC address field of the packet with the MAC address of the VM and forward the packet to the VM.

7. The system of claim 4, wherein the hypervisor includes packet mapping logic to map a packet received from the switch and including a destination IP address field having an IP address of a first VM of the plurality of VMs and a destination MAC address field having the MAC address of the hypervisor to the first VM.

8. The system of claim 7, wherein the packet mapping logic is to access the mapping table to determine that the first VM is the destination VM.

9. The system of claim 7, wherein the packet mapping logic is to receive a packet from a second VM of the plurality of VMs and to forward the packet to the switch with a source MAC address field having the MAC address of the hypervisor and not including the MAC address of the second VM.

10. A non-transitory storage medium comprising instructions that enable a computing system to:
   receive, in a hypervisor, a packet including a destination media access control (MAC) address field having a MAC address of the hypervisor and a destination Internet protocol (IP) address field having an IP address of a virtual machine (VM) coupled to the hypervisor;
   determine, in the hypervisor, a MAC address of the VM using the IP address of the VM;
   apply, in the hypervisor, the MAC address of the VM to the destination MAC address field of the packet and forward the packet from the hypervisor to the VM;
   replace the MAC address of the hypervisor with the MAC address of the VM;
   access a mapping table associated with the hypervisor to determine the MAC address of the VM;
   populate the mapping table with the MAC address of the VM using information from a provisioning manifest for the VM stored in the hypervisor; and
   create the provisioning manifest during instantiation of the VM.

* * * * *